United States Patent [19]

Drakulich

[11] Patent Number: 4,726,001

[45] Date of Patent: Feb. 16, 1988

[54] QUICKNESS MEASURING DEVICE

[76] Inventor: Duke J. Drakulich, 3430 W. Plumb La., Reno, Nev. 89502

[21] Appl. No.: 33,666

[22] Filed: Apr. 3, 1987

[51] Int. Cl.[4] ........................... G04F 8/00; G01P 3/66

[52] U.S. Cl. .................................... 368/110; 368/113; 324/180

[58] Field of Search ................................ 368/107–113, 368/3, 9, 10; 324/180; 377/5, 20

[56] References Cited

U.S. PATENT DOCUMENTS

| | | | |
|---|---|---|---|
| 2,948,851 | 8/1960 | Dekan | 324/180 |
| 4,075,829 | 2/1978 | Goff | 368/13 |
| 4,259,551 | 3/1981 | Ohtani et al. | 200/5 A |
| 4,615,624 | 10/1986 | Goodrich | 368/1 |

*Primary Examiner*—Vit W. Miska

*Attorney, Agent, or Firm*—Munson H. Lane, Jr.

[57] ABSTRACT

A device for measuring a person's quickness comprising a stopwatch, a measured length of cord, and a pair of tags. Each of the tags has a clip at one end for securing the tag to the clothing of a person whose quickness is to be measured. One tag is connected to one end of the cord by a Velcro type separable fastener, the other tag is connected by a Velcro type separable fastener to a pull strap which actuates the stopwatch to start and stop the stopwatch upon successive pulls of the pull strap. The other end of the cord is also connected to the pull strap. When the stopwatch is held at a starting position and the person being tested leaves the starting position, the tag connected to the pull strap actuates the stopwatch to turn it on and then separates from the pull strap. When the person has run a predetermined distance equal to the length of the cord, the cord pulls the pull strap to stop the stopwatch and then is separated from the tag attaching the cord to the person's clothing. The time displayed on the stopwatch between starting and stopping is an indication of the person's quickness.

9 Claims, 8 Drawing Figures

QUICKNESS MEASURING DEVICE

BACKGROUND OF THE INVENTION

1. Field of the Invention

This invention relates to a portable timing device, and more particularly to a timing device for measuring the quickness of a person by accurately measuring the time it takes for a person to move from a start position over a predetermined, relatively short distance.

2. Description of the Prior Art

For persons involved in training athletes, there is a need to measure and improve a person's quickness, or the person's ability to move rapidly from a start position over a predetermined relatively short distance from the start position. One person may have a capability of moving very rapidly from a zero speed, start position over a relatively short distance, while another person may be slow to start but when started and having picked up speed, that person can reach and maintain a high speed for long periods of time. The quickness of the two persons may be entirely different.

When a timing device is being used to measure how fast a person can move from standstill over a short distance, the timing device must start at the moment the person leaves the start position and must stop at the moment the person completes the predetermined distance from the start position which is being used as a standard course for measuring quickness. The timing device must also be capable of providing accurate indications of time for very brief time periods, therefore, a timer capable of indicating minutes, seconds and fractions of a second, such as thousands of one second, is preferred for use as a quickness measuring device.

The common stopwatch which requires a timekeeper to push a start/stop button when a person leaves a start position and when the person finishes the course laid out, is unreliable for measuring quickness because it depends upon the response time of the timekeeper who may not push the start/stop button at the precise instant when the person starts and completes the course. It is, therefore, preferable for the quickness device to be controlled by the movements of the person whose quickness is being measured.

Highly accurate electronic devices having optical or light sensors for sensing a person's position at the start and finish lines of a course are available but most of the prior art devices are relatively complex and expensive, and often require fixed installations which make them unsuitable or unavailable for use by many athletic trainers.

An early attempt to eliminate the function of a timekeeper and to have a runner initiate and stop the function of an electric timer is disclosed in U.S. Pat. No. 2,948,851, issued Aug. 9, 1960 to G. J. Dekan. The present invention distinguishes from and is considerably less complex than the apparatus disclosed by Dekan.

It is an object of the present invention to provide a reliable, relatively inexpensive and portable timing device which is available and suitable for use by most athletic trainers, or individuals for measuring a person's quickness in order to provide an index by which the quickness of athletes and other persons may be compared.

It is a further object of this invention to provide a timing device which is started and stopped by the movements of the person whose quickness is being measured rather than by the actions of a timekeeper.

It is a further object of this invention to provide a portable, pocket size, battery operated electric timing device that coaches, athletic trainers and others can carry out on the field and which can be triggered on and off by the action of an athlete undergoing testing.

SUMMARY OF THE INVENTION

In accordance with this invention, there is provided a portable timing device including an electric stopwatch having start/stop means for starting and stopping the stopwatch and reset means for resetting the stopwatch to zero, pull means for actuating the start/stop means, a cord of predetermined length having one end connected to the pull means and its other end separably connected by a Velcro type fastener to a flexible tag attached to the person of an athlete, and another flexible tag attached to the person of an athlete at one end and separably connected at its other end to the pull means for actuating the start/stop means, the tag attached to the pull means being capable of exerting a pull upon the pull means for starting the stopwatch when the athlete leaves a starting position while the timing device is held adjacent the starting position and then separating from the pull means, and the tag attached to the other end of the cord being capable of exerting a tug upon the cord sufficient to actuate the pull means for stopping the stop watch and then separating from the cord after the athlete has run a distance equal to the length of the cord.

A better understanding of the invention will be achieved when the following detailed description is considered in conjunction with the appended drawings in which like reference numerals are used for the same parts as illustrated in the different figures.

DESCRIPTION OF THE PREFERRED EMBODIMENT

Figure 1:
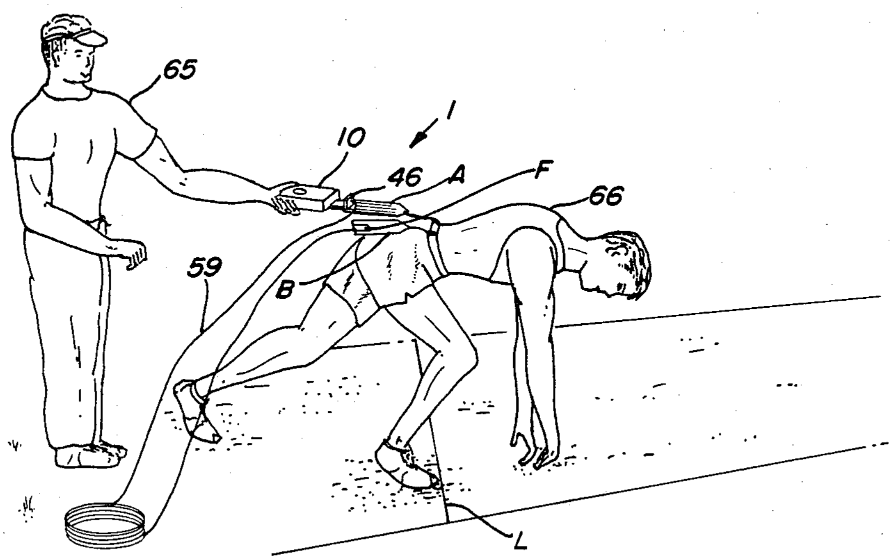
FIG. 1 is a perspective view showing a runner in the starting position on a track with the portable timing device of this invention held adjacent the runner and connected to the runner by a pair of flexible tags and a cord.
Figure 7:
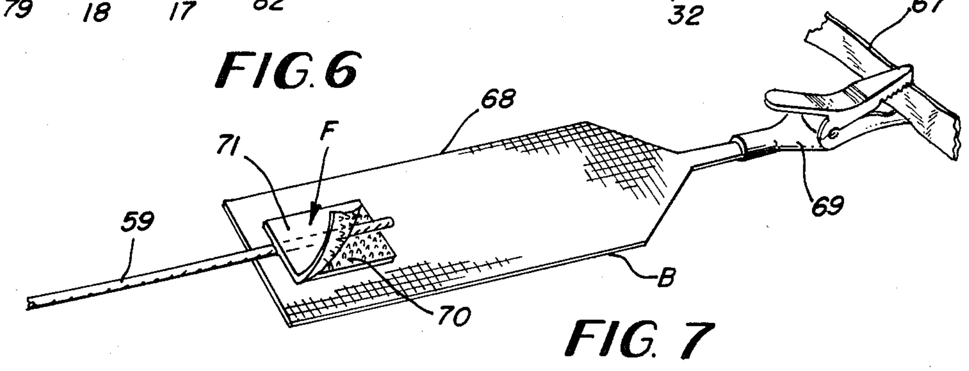
FIG. 7 is a perspective view of one of the flexible tags showing it clipped to a runner's belt and connected to a cord by a separable Velcro fastener.

Referring to FIG. 1 of the drawings, the quickness measuring device of this invention is generally indicated by the numeral 1. It comprises a portable timer 10, a cord 59 and a pair of similar flexible tags A and B. The portable timer 10 is shown in FIG. 1 as being in the hand of an athletic instructor 65 or other person assisting in measuring the quickness of an athlete 66 (or any other person) at the starting line L of a track, or other selected course, over which the person 66 will run. The portable timer 10 has an enclosed stopwatch 11 (see FIG. 5) with a start/stop button 12 which is actuated each time a pull strap or trigger 46 is pulled to alternately start and stop the stopwatch. The flexible tags A and B (see FIG. 7) each comprises a fabric strip 68 having a clip 69, such as an alligator clip, secured at one end by which the strip is detachably secured to the person of the athlete 66, preferably at the waist, or belt 67. At the end of the strip 68 opposite the end to which the alligator clip is secured, one member 70 of a two member separable fastener F, preferably of the Velcro type, is adhesively secured. The tags A and B are shown in FIG. 1 clipped to the belt 67 of the athlete 66. One end of the cord 59 is secured to the pull strap 46 by a clip 60 in the manner shown more clearly in FIGS. 4 and 5. The other end of the cord 59 has a second member 71 of a two part Velcro type separable fastener F secured thereto by adhesive, stitching or by any other means for permanently securing the member 71 to the cord. The members 70, 71 have multiple projecting filaments 64 which randomly interlock and detachably secure the members together in the well known manner of a Velcro fastener. Some of the filaments on one member preferably have resilient hooks which interlock with filaments having loops on the other member, however, the exact structure of the Velcro type separable fastener is not a limitation of this invention. The fasteners F, however, must be capable of separation upon the exertion of a pull of some predetermined force tending to separate the cord 59 from the tag B.

As further shown in FIG. 1, the tag A is detachably secured to the underside of the pull strap 46 by a Velcro type separable fastener F (not visible). The tag A, similar to the tag B, has one member 70 of a Velcro fastener adhesively, or otherwise secured thereto. The underside of the strap 46 has a mating member 71 of a separable fastener F secured thereto by adhesive 63 (see FIG. 6).

Figure 2:
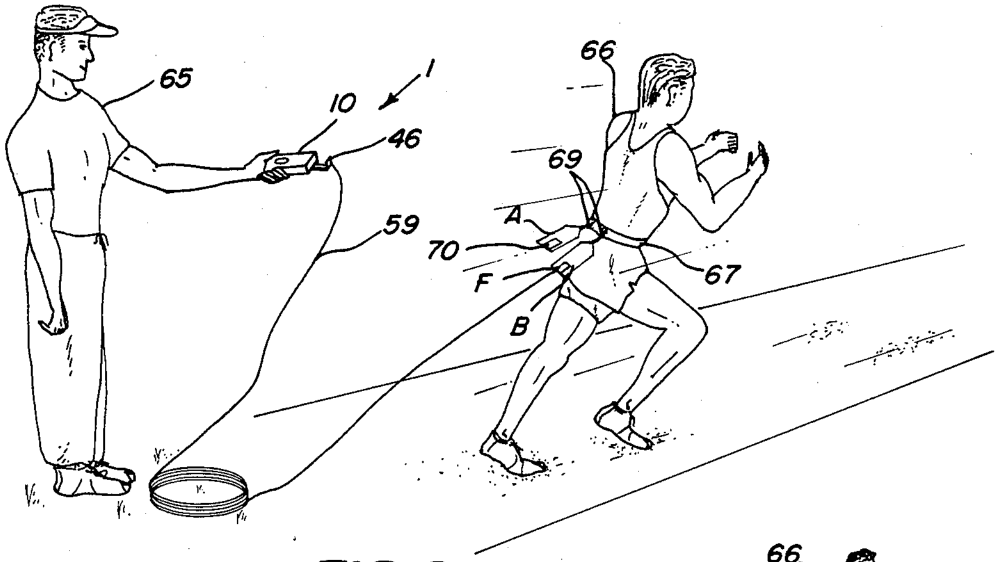
FIG. 2 is a perspective view showing the runner of FIG. 1 after he has left the starting position, and after one of the tags connected to the runner has become separated from the pull strap extending from the timer after exerting a pull upon the strap to start the timer.
Figure 3:
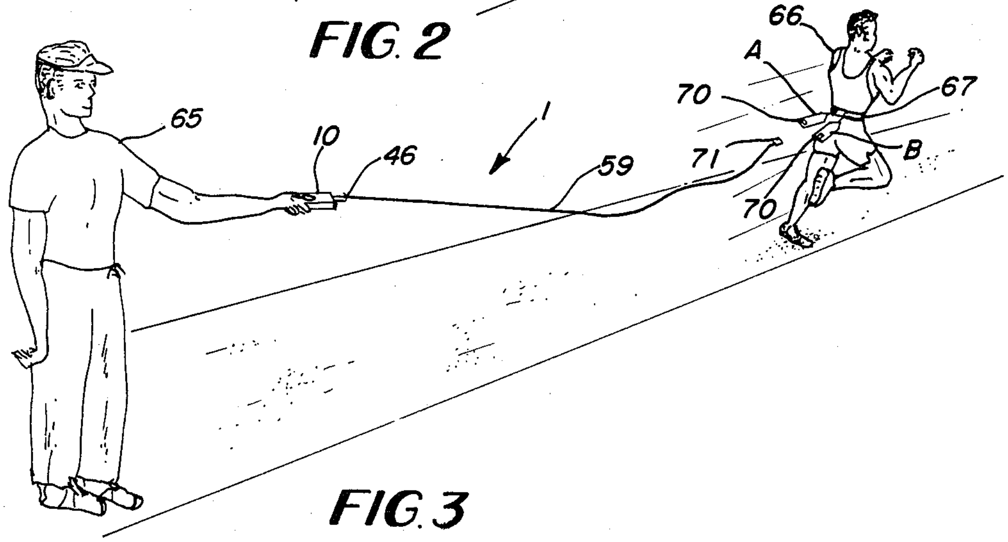
FIG. 3 is a perspective view showing the runner of FIG. 1 at the end of his run and with the tag which was connected to the cord at the beginning of the run, separated from the cord after the cord has been pulled taut to stop the timer.

FIGS. 1 through 3 illustrate the use of the quickness measuring device of this invention. As seen in FIG. 1, the athlete 66 is in starting position ready to begin a test of quickness by running a predetermined distance. The timer 10 has been reset to zero and is in the stop condition. The cord 59 is secured at one end to the pull strap 46 and is detachably secured at its other end to tag B by a separable fastener F. The tag A is detachably secured to the pull strap 46 by another separable fastener F. Both tags A and B are secured by clips 69 to the belt of the athlete 66. The person 65 assisting in measuring the quickness of the athlete holds the timer 10 adjacent the athlete 66, as shown in FIG. 1, with the tag A taut.

As soon as the athlete leaves the start position moving in the forward direction, the tag A exerts a pull upon the pull strap 46 sufficient to trigger the stopwatch to start timing and at the same time exerts sufficient pull upon the separable fastener F, which connects the tag to the pull strap, to separate the fastener members 70, 71 whereupon the tag A becomes detached from the pull strap 46 but remains attached to the belt of the athlete as seen in FIG. 2. The athlete 66 runs from the starting line L as fast as he is able in a straight line pulling the cord 59 behind him. The cord 59 must be coiled as shown or otherwise arranged so that it will not tangle as the athlete pulls the cord behind him.

FIG. 3 shows the cord 59 after the athlete 66 has run a predetermined distance equal to the length of the cord 59 whereupon the cord has been pulled taut with sufficient force to trigger the timer 10 to stop condition and to cause the separable fastener F connecting tag B to the cord 59 to separate leaving the tag B as well as tag A dangling from the athlete's belt. The timer 10 is then read to determine the time expended by the athlete in moving from the start position over the predetermined distance from the start position which has been established as a standard.

If several athletes are tested in the manner just described, an index of the relative quickness of the different athletes may be obtained.

Figure 4:
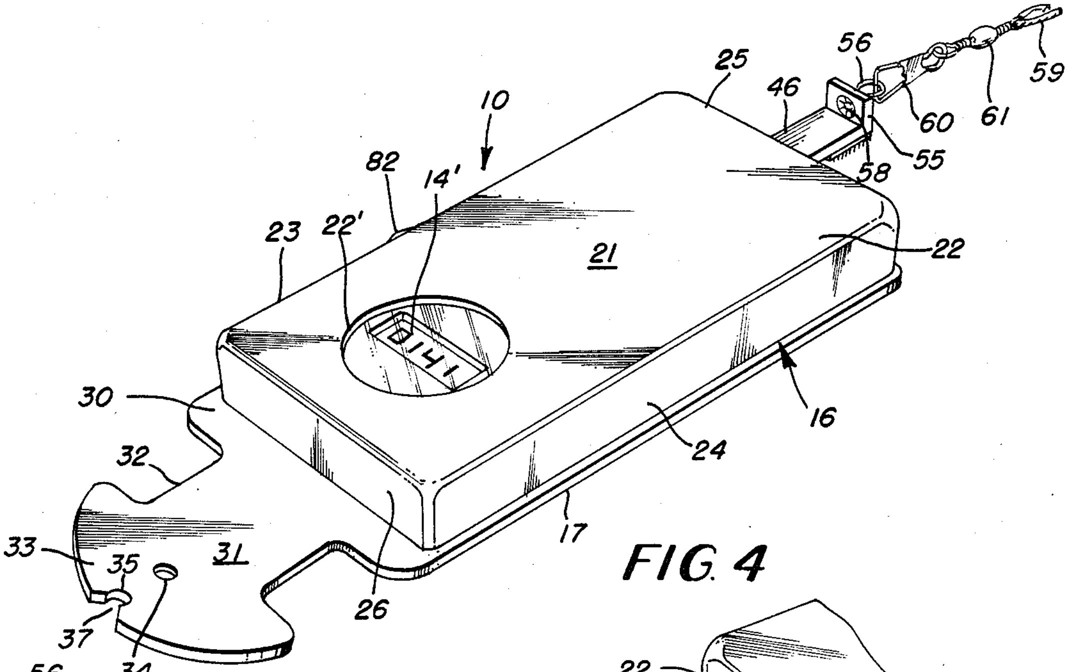
FIG. 4 is a right side top perspective view of the timing device with the cover in place and with a portion of the cord and clip showing.
Figure 5:
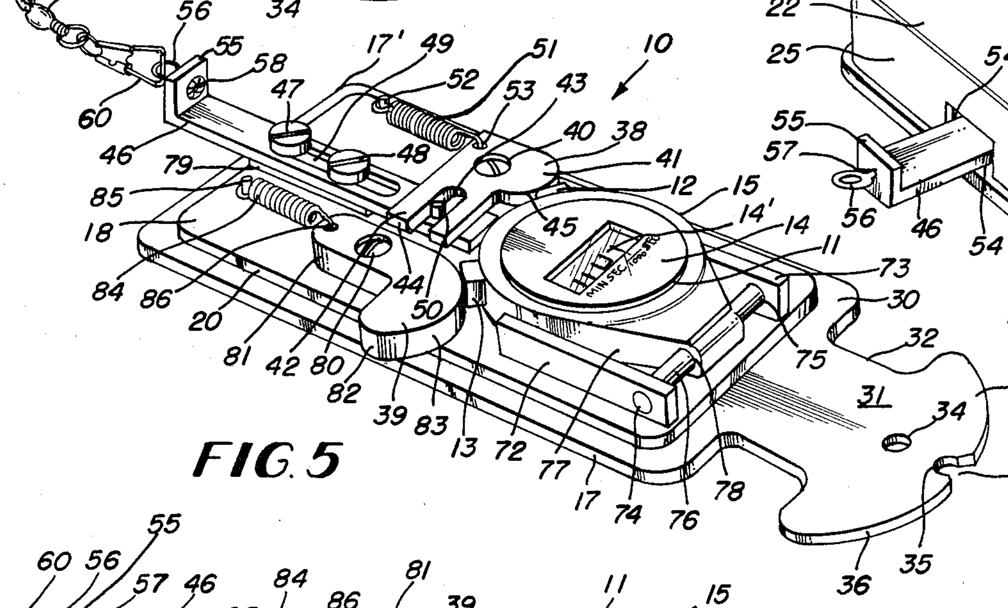
FIG. 5 is a left side top perspective view of the timing device shown in FIG. 4 with the cover removed.
Figure 6:
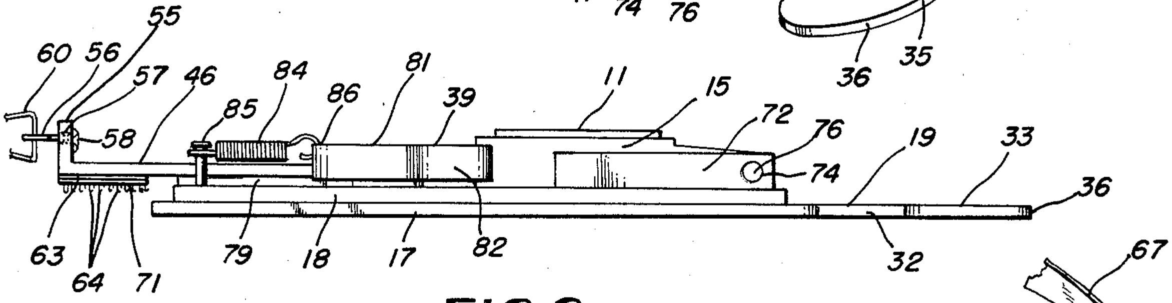
FIG. 6 is a left side elevational view of the timing device shown in FIG. 5 with the cover removed.

Referring now to FIGS. 4–6, the structure of the portable timer 10 will be described in more complete detail. The timer 10 comprises a housing 16 in which is mounted a stopwatch 11 (see FIG. 5) having a start/-stop push button 12, a reset button 13 and a display face 14. The stopwatch 11 is preferably a battery operated digital stopwatch, such as the Microta Timer which is commercially available from Radio Shack. An illuminated digital time display 14', visible through the display face 14, includes multi-segment display units indicating time in minutes, seconds and fractions of a second, preferably thousands of one second.

The housing 16 comprises a flat base plate 17 having a raised rectangular platform 18 on one side 19 thereof and a hollow rectangular cover 21 mounted over the platform 18. The platform 18 has marginal edges indicated at 20 which are offset inwardly from the marginal edges 17' of the base plate. The cover 21 has a cover face 22 provided with a transparent display window 22' overlying the display face 14 of the stopwatch 11, longitudinal side walls 23 and 24, end walls 25 and 26 and an open side (not visible) opposite the display face 14 into which the platform 18 fits with a snug friction fit. Although not shown, screws, bolts or other removable fasteners are preferably provided to secure the cover 21 to the base plate 17.

Extending upwardly from and secured to (or integral with) the platform 18 are upstanding parallel bars 72 and 73 having aligned bores 74, 75 therein adjacent one of their ends into which the opposite ends of a cylindrical pivot pin 76 are secured. The casing 15 of stopwatch 11 has a tapered extension 77 with a cylindrical bore 78 therein through which the pivot pin 76 extends so that the stopwatch 11 may be pivoted about the pivot pin to gain access to the back of the stopwatch for changing the stopwatch battery (not shown), which is mounted therein. The parallel bars 72 and 73 are spaced apart approximately equal to the width of the casing 15 so that the stopwatch 11 fits between the bars.

The base plate 17 has a rectangularly-shaped portion 30 on which the platform 18 is mounted and a lanyard spool portion 31 including a narrow neck portion 32 and an enlarged head portion 33.

A lanyard, or cord 59, subsequently to be described, may be wound about the neck portion 32 for storage. The head portion 33 has a circular aperture 34 located centrally therein and an aperture 35 connected with a curved edge 36 of the head portion by means of a diverging slot 37. The apertures 34 and 35 are provided to facilitate hanging the timer 10 on a mounting rack (not shown).

Operating means for actuating the start/stop push button 12 and the reset button 13 respectively of the stopwatch 11 are mounted on the platform 18 and include a start/stop cam 38 and a reset cam 39.

The start/stop cam 38 is a flat bell crank-type lever plate which is pivotally mounted on the platform 18 by a pivot 40. The lever plate 38 includes a first leg 41 extending toward the start/stop button 12 and a second leg 42 which is substantially perpendicular to the leg 41 and has an elongated slot 43 extending inwardly from the free end 44 of the leg 42. The first leg 41 has a cam surface 45 which engages the push button 12 for actuating same.

A pull strap 46 is reciprocally mounted to slide on a flat spacer bar 79 secured to the platform 18 beneath the strap 46. A pair of longitudinally spaced, headed screws 47 and 48 extend perpendicularly from the spacer bar 79 with the heads spaced above the spacer bar by a distance slightly greater than the thickness of pull strap 46. The screws 47 and 48 extend through an elongated slot 49 in the pull strap 46. The slot 49 has a longitudinal axis coaxial with the longitudinal center of the pull strap, and has a length which is longer than the distance between the screws 47, 48 to provide the desired freedom of movement of the pull strap. A pin 50, projecting from the pull strap 46, engages the slot 43 of the start/stop cam 38. When the pull strap 46 is reciprocated, it oscillates the start/stop cam 38 which in turn actuates the start/stop push button 12 of the stopwatch 11. A return spring 51 anchored to the platform 18 at 52 and to one corner of the start/stop cam lever 38 at 53 rotates the start/stop cam lever counterclockwise as viewed in FIG. 5 to release the start/stop push button 12. An outward pull upon the pull strap 40 rotates the start/-stop cam clockwise to depress the start/stop push button. The start/stop push button 12 starts the stopwatch upon a first depression of the push button 12, and it stops the stopwatch upon a second depression of the push button. Successive depressions of the push button 12 alternately start and stop the stopwatch.

Figure 5A:
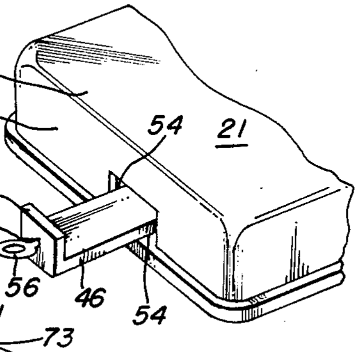
FIG. 5A is a partial perspective view of the end of the timing device shown in FIG. 4 from which the pull strap extends.

The pull strap 46 is preferably a rigid metal bar. It projects through an opening 54 in end wall 25 of the hollow cover 21 (see FIG. 5A) and has a right angle tab at its outer end. An eyelet 56, having its shank extended through an opening 57 in the tab 55 and deformed as indicated at 58 to secure the eyelet to the tab, is provided for the attachment of a lanyard or cord 59 by means of a snap hook or clip 60 and an intermediate swivel 61 which is secured at one end to an end of the lanyard 59.

The reset cam 39 is a flat lever which is pivotally mounted on the platform 18 by means of a pivot 80 extending upwardly from the platform 18 through a longitudinal leg 81 of the reset cam lever 39. The pivot 80 is preferably a headed screw or bolt which secures the reset cam lever to the platform 18. A right angle extension 82 of the lever 80 projects outwardly through the longitudinal side 23 of the cover 21 for the manual operation of the reset cam 39. The reset cam 39 has a curved cam surface 83 which engages the reset button 13 of the stopwatch 11. A spring 84 having one end anchored at 85 to the platform 18, and its other end secured to the free end of the leg 81 of the reset cam 39 normally holds the reset cam 39 in the position shown in FIG. 5. An inward exertion of manual pressure upon the end 82 of the reset cam 39 tends to rotate the reset cam in a counterclockwise direction and in so doing the cam surface 83 depresses the reset button 13 inwardly to reset the stopwatch 11 to zero. Release of manual pressure from the end 82, allows the reset cam 39 to return to its normal position under the bias of the spring 84.

The stopwatch 11 has been described in the foregoing description as being a commercially available stopwatch of a type having a start/stop push button and a reset push button.

It is within the scope of this invention that a modified stopwatch maybe used substituting other means for starting and stopping the timing function of the stopwatch than the start/stop push button and also substituting other means than the reset push button for resetting the stopwatch. In the case of the preferred battery energized digital stopwatch, various switching means which will be recognized by those skilled in the art can be used to execute the start/stop function performed by the start/stop push button 12 and to execute the function of the reset push button 13. Among the switching means envisioned are magnetic switches which would be actuated by the movement of a magnet on the end of the pull strap 46 adjacent to the stopwatch 11.

Further the stopwatch 11 need not be housed in a separate casing from the housing 16, but may be built on a separate circuit board from the platform 18, or even on the platform 17, and enclosed within the housing 16.

While in the foregoing there has been described and shown a preferred embodiment of the invention, various modifications and equivalents may be resorted to within the spirit and scope of the invention as claimed.

What is claimed is:

1. A quickness measuring device for measuring the time it takes for a person to move from a start position over a predetermined distance from said start position comprising a stopwatch having start/stop means for alternately starting and stopping said stopwatch upon successive actuations of said start/stop means and reset means for resetting said stopwatch to zero upon each actuation of said reset means, a cord having opposite ends and a measured length substantially equal to said predetermined distance from the said start position, a pair of tags, each of said tags having fastening means for detachably securing the tag to the person whose quickness is to be measured, pull means connected with said start/stop means for actuating said start/stop means each time a pull is exerted upon said pull means, one end of said cord being secured to said pull means, a first separable fastening means connecting one of said tags to said pull means, and a second separable fastener means connecting the other of said tags to the other end of said cord, said first and second separable fastening means being separable when a predetermined pulling force is exerted thereon, said first separable fastener means connecting said one tag to said pull means being separable when said stop watch is held at the start position and the person leaves the start position and the second separable fastener means connecting the other end of said cord to said second tag being separable when the stopwatch continues to be held at the start position and the person pulls the cord taut upon exceeding said predetermined distance.

2. The quickness measuring device of claim 1 wherein said first and second separable fastener means are Velcro fasteners.

3. The quickness measuring device of claim 1 wherein said first and second separable fastener means each comprise a pair of dissociable fastener strips each having numerous protruding filaments which randomly interlock with protruding filaments on the other strip when the strips are pressed together.

4. The quickness measuring device of claim 3 wherein at least one of said dissociable fasteners strips of each of said first and second separable fastener means has numerous protruding hook-like filaments and the other of said dissociable fastener strips has numerous protruding looped filaments.

5. The quickness measuring device of claim 1 wherein said stopwatch is a battery operated, digital stopwatch having illuminated means for displaying time in minutes, seconds and fractions of a second.

6. The quickness measuring device of claim 1 wherein said stopwatch is mounted in a housing, said housing including a base and a hollow cover, means for detachably securing said hollow cover to said base, said stopwatch including a casing having a display face, and a time display visible through said display face, means for mounting said stopwatch on said base with its display face opposite said base, said cover having a display window overlying said display face through which said time display is visible, said start/stop means including start/stop push button means extending outwardly from the casing of said stopwatch and mechanical means mounted on said base and interconnecting said start/stop push button means and said pull means for actuating said push button means each time said pull means is pulled to alternately start and stop said stopwatch.

7. The quickness measuring device of claim 6 wherein said housing is portable and of a size to be held in one band.

8. The quickness measuring device of claim 7 wherein said base has spool means externally of said cover on which said cord may be wound.

9. The quickness measuring device of claim 6 wherein said pull means includes a rectangular elongated bar reciprocably mounted on said base with one end projecting outwardly of said housing and with its other end extending toward said stopwatch within said housing, a pin projecting from said bar opposite said base, said mechanical means includes a lever, a pivot pivotally mounting said lever on said base laterally of said bar, said lever having a first leg extending from said pivot toward said bar and a second right-angle leg extending from said pivot toward said start/stop push button, said first leg having an end opposite said pivot which overlies said bar, and has a longitudinal slot therein which slidably engages said projecting pin on said bar, said second leg having a cam face slidably engaging said start/stop push button, and spring means anchored to said base for biasing said lever to rotate in a direction to move said cam face away from said push button.

* * * * *